(12) United States Patent
Kagitani

(10) Patent No.: US 9,501,854 B2
(45) Date of Patent: Nov. 22, 2016

(54) COLOR-SAMPLE IMAGE GENERATOR, COLOR-SAMPLE GENERATOR, COLOR-SAMPLE GENERATION METHOD, AND COLOR-SAMPLE

(71) Applicant: Kenji Kagitani, Kanagawa (JP)

(72) Inventor: Kenji Kagitani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/688,315

(22) Filed: Apr. 16, 2015

(65) Prior Publication Data

US 2015/0317805 A1 Nov. 5, 2015

(30) Foreign Application Priority Data

Apr. 30, 2014 (JP) ................................. 2014-093578

(51) Int. Cl.
| | |
|---|---|
| *G06K 9/32* | (2006.01) |
| *G06T 11/60* | (2006.01) |
| *G06T 11/00* | (2006.01) |
| *G06T 7/40* | (2006.01) |

(52) U.S. Cl.
CPC ............. *G06T 11/60* (2013.01); *G06T 7/408* (2013.01); *G06T 11/001* (2013.01); *G06T 2207/10024* (2013.01)

(58) Field of Classification Search
CPC ..... G06T 11/001; G06T 11/60; G06T 7/408; G06T 2207/10024; G06T 5/001; G06T 3/403; G06T 3/4007; H04N 1/6058; H04N 9/045
See application file for complete search history.

(56) References Cited

U.S. PATENT DOCUMENTS

| | | | | |
|---|---|---|---|---|
| 7,555,160 | B2* | 6/2009 | Luo .......................... | G01J 3/46 358/1.9 |
| 8,593,680 | B2* | 11/2013 | Woolfe ............... | G06F 17/3025 358/1.9 |
| 8,724,894 | B1* | 5/2014 | Jensen .................. | G06T 11/001 358/529 |
| 9,134,179 | B2* | 9/2015 | Chong .................... | G01J 3/528 |
| 2001/0052904 | A1* | 12/2001 | Sano ...................... | G06K 15/02 345/589 |
| 2008/0299521 | A1* | 12/2008 | Taylor ...................... | G01J 3/52 434/98 |
| 2009/0295822 | A1* | 12/2009 | Okada ................... | G06T 11/001 345/589 |
| 2015/0317805 | A1* | 11/2015 | Kagitani ............... | G06T 11/001 382/162 |

FOREIGN PATENT DOCUMENTS

JP 2013-017111 1/2013

* cited by examiner

*Primary Examiner* — Amir Alavi
(74) *Attorney, Agent, or Firm* — Oblon, McClelland, Maier & Neustadt, L.L.P.

(57) ABSTRACT

A color sample image generator, a color-sample generator, and a color sample generation method are provided. The color-sample image generator produces a color sample, and lightness of every pixel of a first area of a first image from which the color sample is to be extracted is measured and all the pixels are arranged in a second area of a second image that is different from the first area based on lightness level. The color-sample generator and the color-sample generation method includes obtaining all pixels of a first area of a first image from which a color sample is to be extracted, measuring a level of lightness of each of the obtained pixels of the first area, and rearranging each of the pixels whose lightness has been measured in a second area of a second image that is different from the first area.

9 Claims, 13 Drawing Sheets

FIG. 3A

| ITEM | | DESCRIPTION |
|---|---|---|
| CASE IDENTIFICATION INFORMATION | TYPE | STANDARD TYPE |
| | CASE ID | 0001 |
| | IMAGE A | img0001.jpg |
| | COLOR-TONE DATA (AVERAGE Lab VALUE) OF IMAGE A | (50, 12, 15) |
| | IMAGE B | img0002.jpg |
| | COLOR-TONE DATA (AVERAGE Lab VALUE) OF IMAGE B | (34, 11, 14) |
| | IMPRESSION | DARK, SMOOTH |
| | SHAPE OF SELECTED AREA | CIRCULAR |
| | DATA OF SELECTED AREA | CENTER (50, 50), RADIUS 50 |
| REFERENCE INFORMATION AT EDITING | IMAGE PROCESSING OPERATOR | L TONE CURVE |
| | IMAGE PROCESSING PARAMETER | (CONTROL POINT INFORMATION) |
| | . . . | . . . |

FIG. 3B

| ITEM | | DESCRIPTION |
|---|---|---|
| CASE IDENTIFICATION INFORMATION | TYPE | TRANSFER TYPE |
| | CASE ID | 0001-2 |
| | IMAGE A | NULL |
| | COLOR-TONE DATA (AVERAGE Lab VALUE) OF IMAGE A | NULL |
| | IMAGE B | img0002.jpg |
| | COLOR-TONE DATA (AVERAGE Lab VALUE) OF IMAGE B | (34, 11, 14) |
| | IMPRESSION | DARK, SMOOTH |
| | SHAPE OF SELECTED AREA | CIRCULAR |
| | DATA OF SELECTED AREA | CENTER (50, 50), RADIUS 50 |
| REFERENCE INFORMATION AT EDITING | IMAGE PROCESSING OPERATOR | TRANSFER OPERATOR |
| | IMAGE PROCESSING PARAMETER | NULL (SEE IMAGE B) |
| | . . . | . . . |

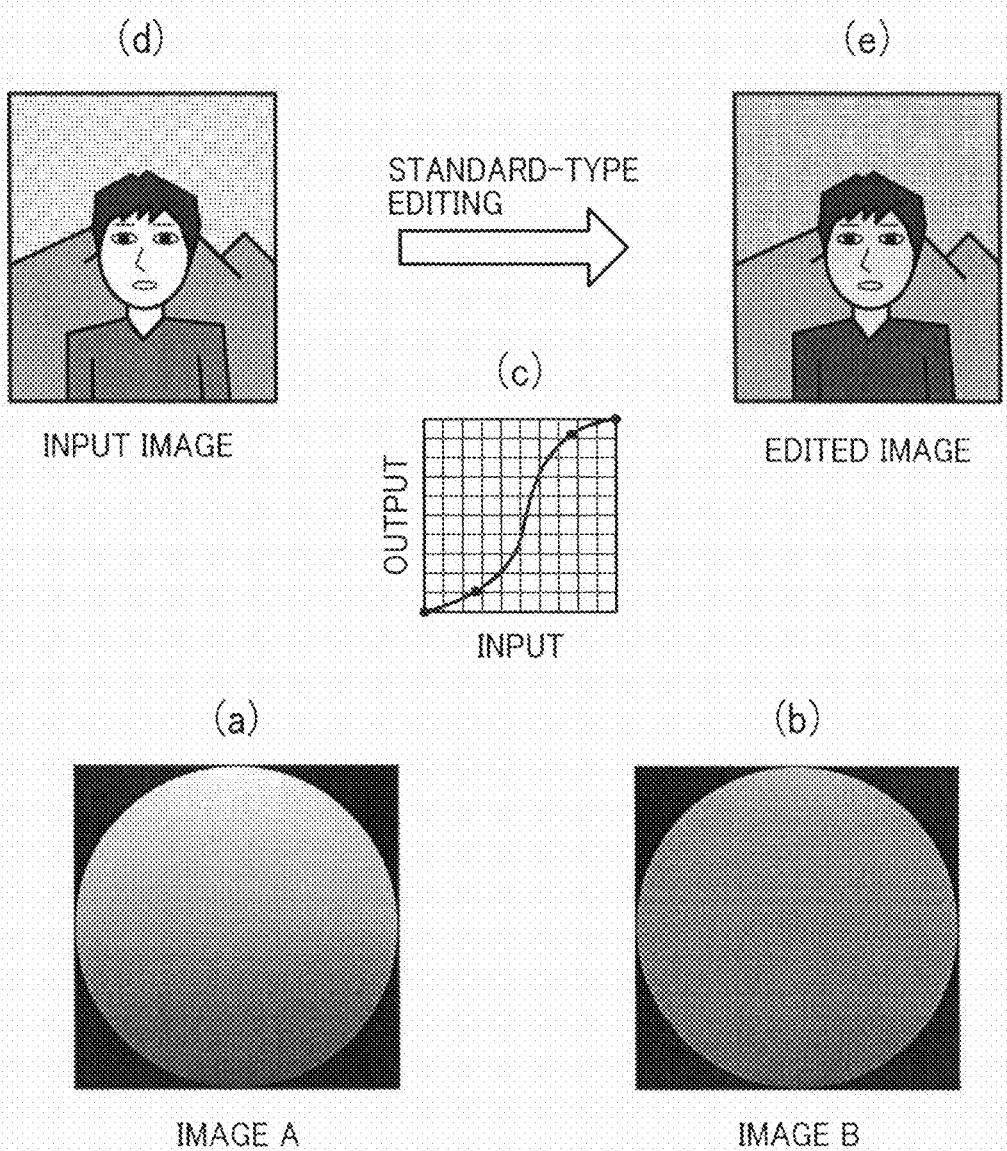

FIG. 5
(b)
INPUT IMAGE
TRANSFER-TYPE EDITING ⟹
(c)
EDITED IMAGE
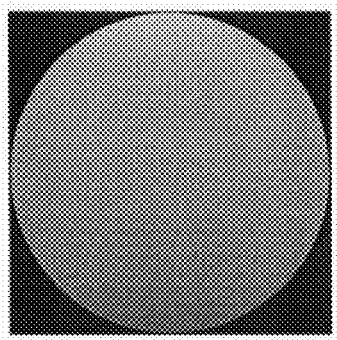
(a)
REFERENCE IMAGE (IMAGE B)

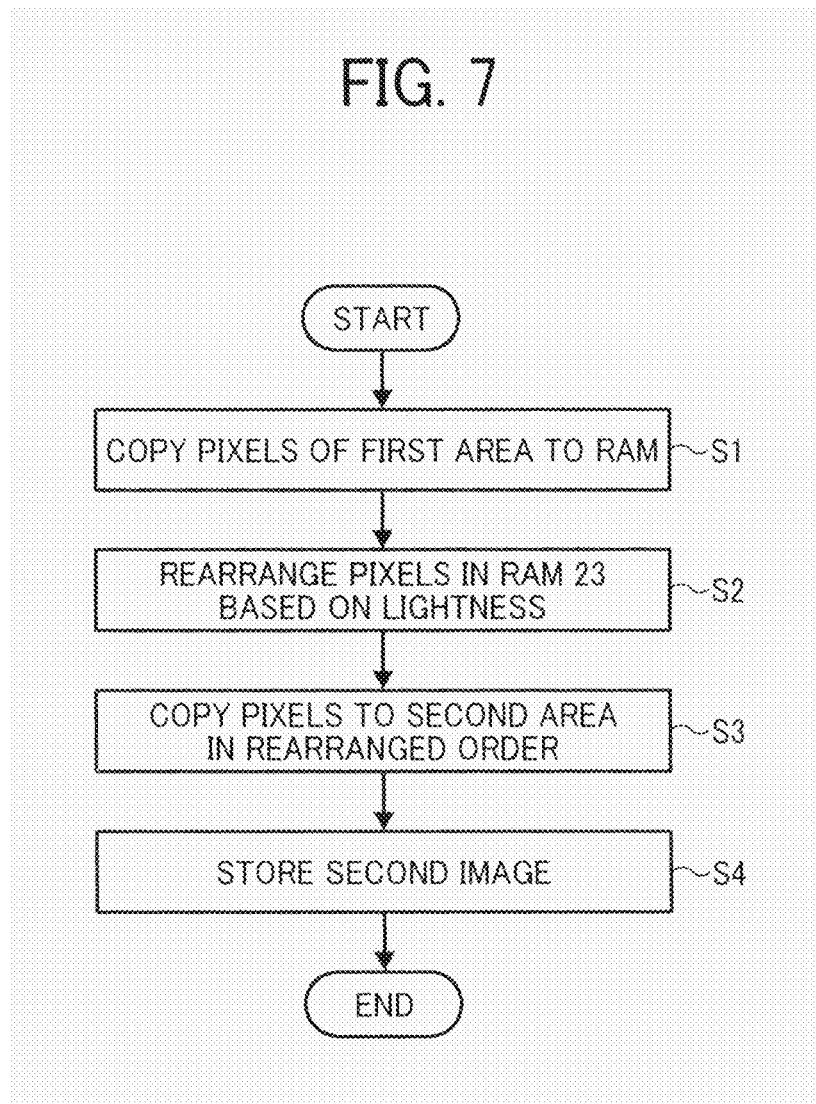

FIG. 8A
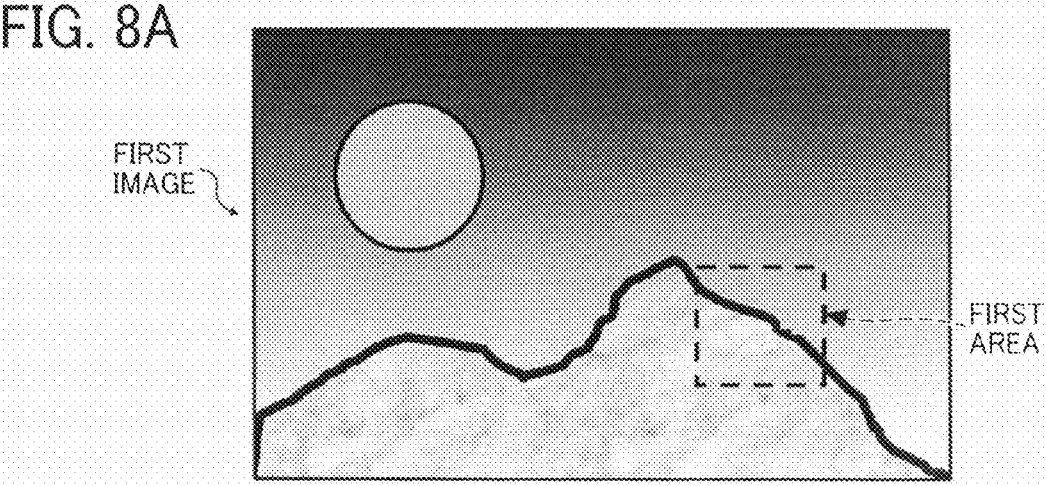
FIRST IMAGE
FIRST AREA
FIG. 8B
FIRST AREA
FIG. 8C
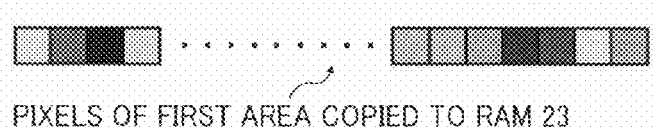
PIXELS OF FIRST AREA COPIED TO RAM 23
FIG. 8D DARK 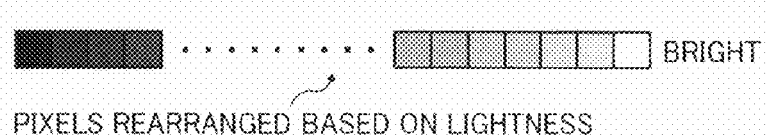 BRIGHT
PIXELS REARRANGED BASED ON LIGHTNESS
FIG. 8E
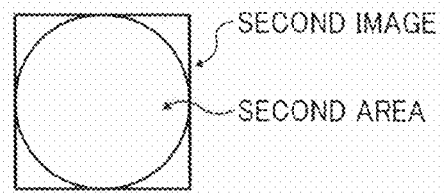
SECOND IMAGE
SECOND AREA
FIG. 8F
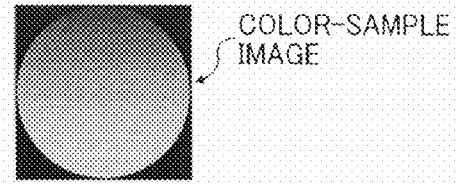
COLOR-SAMPLE IMAGE

PIXELS OF FIRST AREA COPIED TO RAM 23

PIXELS REARRANGED BASED ON LIGHTNESS

LINEARLY INTERPOLATED PIXELS

FIG. 10A

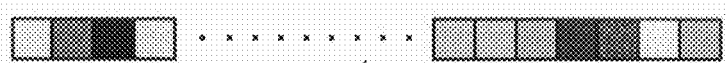

PIXELS OF FIRST AREA COPIED TO RAM 23

FIG. 10B

DARK                                         BRIGHT

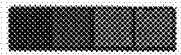        

PIXELS WITH                 PIXELS WITH
EQUAL LIGHTNESS             EQUAL LIGHTNESS

PIXELS REARRANGED BASED ON LIGHTNESS
IN ASCENDING ORDER FROM LEFT TO RIGHT

FIG. 10C

DARK                                         BRIGHT

        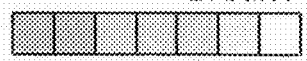

PIXELS REARRANGED BASED      PIXELS REARRANGED BASED
ON COLOR SATURATION IN       ON COLOR SATURATION IN
ASCENDING ORDER FROM         ASCENDING ORDER FROM
LEFT TO RIGHT                LEFT TO RIGHT

PIXELS REARRANGED BASED ON LIGHTNESS
IN ASCENDING ORDER FROM LEFT TO RIGHT

FIG. 11A
PIXELS OF FIRST AREA COPIED TO RAM 23

FIG. 11B
BRIGHT ........ DARK
PIXELS WITH EQUAL LIGHTNESS  PIXELS WITH EQUAL LIGHTNESS
PIXELS REARRANGED BASED ON LIGHTNESS IN DESCENDING ORDER FROM LEFT TO RIGHT FIG. 11C
BRIGHT ........ DARK
PIXELS REARRANGED BASED ON COLOR SATURATION IN DESCENDING ORDER FROM LEFT TO RIGHT  PIXELS REARRANGED BASED ON COLOR SATURATION IN DESCENDING ORDER FROM LEFT TO RIGHT
PIXELS REARRANGED BASED ON LIGHTNESS IN DESCENDING ORDER FROM LEFT TO RIGHT FIG. 11D
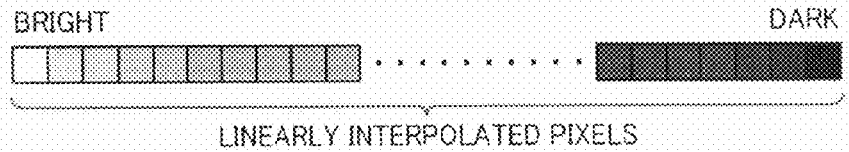
BRIGHT ........ DARK
LINEARLY INTERPOLATED PIXELS FIG. 11E
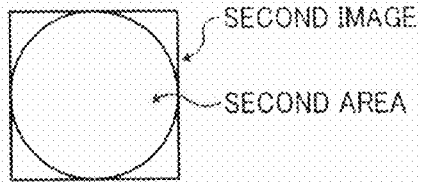
SECOND IMAGE
SECOND AREA FIG. 11F
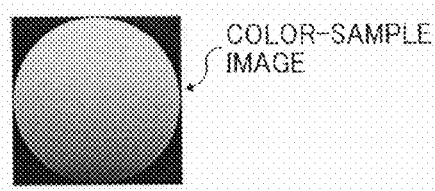
COLOR-SAMPLE IMAGE

COLOR-SAMPLE IMAGE GENERATOR, COLOR-SAMPLE GENERATOR, COLOR-SAMPLE GENERATION METHOD, AND COLOR-SAMPLE

CROSS-REFERENCE TO RELATED APPLICATION

This patent application is based on and claims priority pursuant to 35 U.S.C. §119(a) to Japanese Patent Application No. 2014-093578, filed on Apr. 30, 2014, in the Japan Patent Office, the entire disclosure of which is hereby incorporated by reference herein.

BACKGROUND

1. Technical Field

Example embodiments of the present invention generally relate to a color sample image generator, a color-sample generator, a color sample generation method, and a color sample.

2. Background Art

Color samples that serve as a color chart simulate how color appears on an object. Conventional color samples are composed of rectangular monochrome patches each of which is extracted from an area with uniform color.

Such color samples are originally used as samples for the coloring of printed materials or other kinds of objects. Alternatively, color samples are used to check the color reproduction after the printed materials or objects are colored.

SUMMARY

Embodiments of the present invention described herein provide a color sample image generator, a color-sample generator, and a color sample generation method. The color-sample image generator produces a color sample, and lightness of every pixel of a first area of a first image from which the color sample is to be extracted is measured and all the pixels are arranged in a second area of a second image that is different from the first area based on lightness level. The color-sample generator and the color-sample generation method includes obtaining all pixels of a first area of a first image from which a color sample is to be extracted, measuring a level of lightness of each of the obtained pixels of the first area, and rearranging each of the pixels whose lightness has been measured, based on the level of lightness, in a second area of a second image that is different from the first area.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIGS. 3A and 3B illustrate examples of case information used to perform image editing in an image processing system according to an example embodiment of the present invention.

FIG. 4 is a set of diagrams illustrating the standard-type image editing performed by an image processing system, according to an example embodiment of the present invention.

FIG. 5 is a set of diagrams illustrating the transfer-type image editing performed by an image processing system, according to an example embodiment of the present invention.

FIG. 7 is a flowchart of the procedure for generating a color-sample image according to a first example embodiment of the present invention.

FIGS. 8A to 8F illustrate the procedure for generating a color-sample image according to the first example embodiment of the present invention.

FIGS. 10A to 10C illustrate the procedure for generating a color-sample image according to a third example embodiment of the present invention.

FIGS. 11A to 11F illustrate the procedure for generating a color-sample image according to a fourth example embodiment of the present invention.

Figure 1:
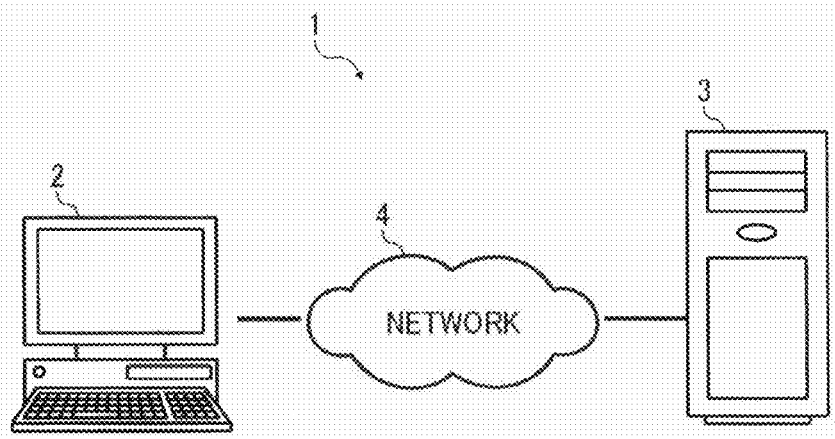
FIG. 1 is a schematic diagram of an image processing system according to an example embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Example embodiments of the present invention are described below with reference to the drawings.

FIG. 1 is a schematic diagram of an image processing system according to an example embodiment of the present invention.

As illustrated in FIG. 1, an image processing system 1 includes, for example, an image processing device 2 and a server 3. In the image processing system 1, the image processing device 2 and the server 3 are connected to each other through a network 4.

The image processing device 2 may be, for example, a personal computer (PC) or a tablet PC that can edit an input image (un-edited image) such as a photograph to be edited according to color samples, as will be described later.

The image processing device 2 receives a first image from which a color sample is to be extracted, and generates a color sample from the received first image. The hardware configuration or function of the image processing device 2, or the processes performed by the image processing device 2 are described later.

The server 3 may be a PC or a workstation, and stores the first image and the color sample generated based on the first image, as an image data (such image data will be referred to as color-sample image in the following description). Moreover, the server 3 stores an input image such as a photograph to be edited as image data. Note that the hardware configuration of the server 3 may be similar to that of the image processing device 2, and thus the description of the hardware configuration of the server 3 is omitted.

The network 4 is configured by the wide area network (WAN) or the Internet.

In the image processing system 1 described above, the image processing device 2 accesses the server 3 through the network 4 to send a request for the transfer of various kinds of data to the server 3, and the image processing device 2 obtains the requested data from the server 3.

In the image processing system 1 according to the present example embodiment, the first image as an original image or the various kinds of data such as the generated color-sample image may be stored in a storage device of the image processing device 2, instead of storing it in the server 3. In such cases, the image processing system 1 may be configured only by the image processing device 2.

Alternatively, the image processing system 1 according to the present example embodiment may store the first image from which a color sample is to be extracted or the various kinds of data such as the color-sample image generated from the first image in a separate device other than the image processing device 2 and the server 3. In such cases, the image processing system 1 includes the image processing device 2 and the separate device.

Further, the image processing system 1 may include two or more image processing devices 2 or two or more servers 3, and various kinds of devices such as a scanner and a camera that can be connected to the network 4.

The image processing device 2 and the server 3 may be connected to the network 4 through a wired or a wireless connection. When the image processing device 2 and the server 3 are connected to the network 4 through the wireless connection, the connection is established through a base station called access point.

Alternatively, the image processing device 2 and the server 3 may be directly connected to each other by wire, without the network 4.

Figure 2:
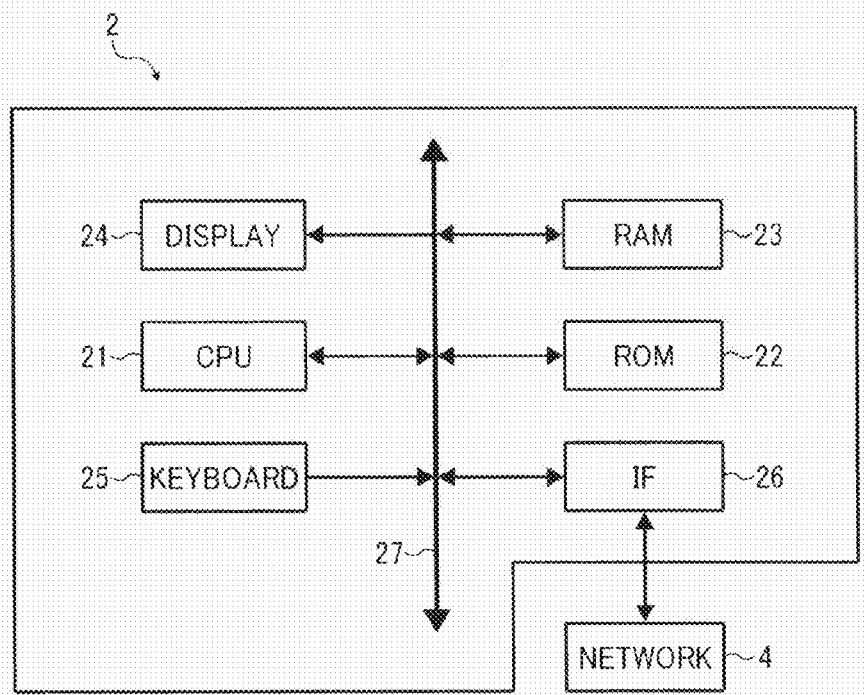
FIG. 2 is a block diagram illustrating the configuration of an image processing device in an image processing system, according to an example embodiment of the present invention.

FIG. 2 is a block diagram illustrating the configuration of the image processing device 2, according to the present example embodiment.

As illustrated in FIG. 2, the image processing device 2 is a PC including a central processing unit (CPU) 21, a read only memory (ROM) 22, a random access memory (RAM) 23, a display 24, a keyboard 25, and a communication interface (IF) 26 used to communicate with an external device such as the network 4.

The elements of the image processing device 2, i.e., the CPU 21, the ROM 22, the RAM 23, the display 24, the keyboard 25, and the IF 26, may be connected to each other through the bus 27.

The ROM 22 stores, in advance as an executable program, the procedure (a plurality of instructions) for generating a color-sample image or editing an input image such as a photograph, as will be described later.

Moreover, the ROM 22 serves as an information storage unit that stores a plurality of items of case information including reference information at editing and case identification information (see FIGS. 3A and 3B). The reference information at editing is referred to for the specification of the editing processes, and the case identification information is used to distinguish between cases.

The information storage unit is not limited to the ROM 22, but may be, for example, a storage device including a recording medium such as a hard disk from which a program to be executed by the CPU 21 or other various kinds of data are read.

The RAM 23 is mainly used as a working area in which the CPU 21 executes a program.

The display 24 may be, for example, a liquid crystal display (LCD) or a display panel with touch sensor. The display 24 serves as a display unit that displays various kinds of information or data and a plurality of items of case information stored in the ROM 22 according to the case identification information included in the case information.

The keyboard 25 is operated, for example, by a user such as a checker who checks the color reproduction of a photograph when a color-sample image is generated, and is used to make various kinds of instructions or input a parameter value. Moreover, the keyboard 25 serves, for example, as a case selection unit that receives an input by which one of the items of case information displayed on the display 24 is selected when an input image such as a photograph is to be edited.

The CPU 21 controls the ROM 22, the RAM 23, the display 24, the keyboard 25, and the IF 26 through the bus 27. The CPU 21 serves, for example, as an image acquisition unit that obtains an input image such as a photograph from the server 3 as an un-edited image.

Moreover, the CPU 21 generates a color-sample image (i.e., image data that is used as a color sample), as in the procedure that will be described later (see FIG. 7), based on a first image from which a color sample is to be extracted. The color-sample image is used to reproduce an approximate impression of color in actual environments. In other words, the CPU 21 serves as an all-pixel acquisition unit, a lightness (brightness) measuring unit, and a color-sample image generator when a color-sample image is generated.

Moreover, the CPU 21 serves as a case application unit that edits the input image obtained as an un-edited image according to the editing processes specified by the reference information at editing included in the case information that is selected through the keyboard 25.

Note that the image processing system 1 performs editing processes based on a standard type where an input image is edited using a specified image processing method or parameter or a transfer type where an input image is edited so as to approximate a target reference image.

Moreover, the CPU 21 serves as a specification unit that specifies, according to the case identification information, whether the editing processes are performed based on the standard type or the transfer type.

Further, the CPU 21 serves as a display control unit that displays only the reference image as a case image on the display 24 when the type is specified as the transfer type, and that displays two case images before and after the editing on the display 24 when the type is specified as the standard type. Accordingly, the reference image (i.e., case image B) displayed on the display 24 or the case images A and B before and after the editing are used as a color-sample image.

FIGS. 3A and 3B illustrate examples of the case information used to perform image editing in the image processing system 1, according to the present example embodiment.

FIG. 3A illustrates an example of the standard-type case information, and FIG. 3B illustrates an example of the transfer-type case information.

In the present example embodiment, the type of image editing, a case identifier (case ID), the file name of image, color-tone data, impression of image, and the shape of selected area and the data of selected area when a specific area (i.e., first area) is selected are listed as the items of case identification information.

More specifically, FIG. 3A illustrates an example of the standard-type case information and thus the type is set to the standard type, and the impression of the color-sample image that corresponds to the file name of image is described. In the cases of the standard type, two case images are used as color-sample images, and the file names and color-tone data of images A and B are registered.

FIG. 3B illustrates an example of the transfer-type case information and thus the type is set to the transfer type. In the other aspects, FIG. 3B is similar to FIG. 3A that illustrates an example of the standard-type case information. However, in the cases of the transfer type, only a reference image is used as the case image, and only the file name and color-tone data of an image B are registered as an edited case image. Accordingly, "NULL" is given to the description of the file name and color-tone data of the other image (image A) to indicate that no data is available.

Note that the case identification information may include any information that is used to distinguish between cases. Accordingly, the reference information at editing may be included in the case identification information as long as the reference information at editing can be used to distinguish between cases.

As the items of reference information at editing, for example, an image processing operator and an image processing parameter are listed.

The image processing operator indicates an image processing method. In the standard type (see FIG. 3A), "tone curve (L tone curve)" is given as the description (i.e., the name of operator). In the transfer type (see FIG. 3B), "transfer operator" is given as the description.

The image processing parameter is a parameter used in each image processing method. In the standard type (see FIG. 3A), "control point information" that is used to generate "tone curve" is given as the description. In the transfer type (see FIG. 3B), no parameter exists and thus "NULL" is given as the description.

In the present example embodiment, as illustrated in FIG. 3B, the description of the image processing parameter of the transfer type indicates that "SEE IMAGE B" in parentheses after "NULL". This indicates that the image B is to be used as a reference image.

In the present example embodiment, the case information is expressed in a table, but the case information may be described differently such as with extensible markup language (XML). In other words, the case information illustrated in FIGS. 3A and 3B is merely an example, and the case information may be described differently.

FIG. 4 and FIG. 5 illustrate examples of the editing processes performed by the image processing system 1, according to the present example embodiment.

FIG. 4 is a set of diagrams illustrating the standard-type image editing performed by the image processing system 1, according to the present example embodiment. In the editing processes illustrated in FIG. 4, two case images A and B before and after editing (see (a) and (b) in FIG. 4) and a tone curve that is the image processing method used in the case (see (c) in FIG. 4) are used.

In the standard-type image editing, the image processing system 1 uses a tone curve to edit the gradation of the un-edited case image A so as to become equivalent to the edited case image B. By so doing, an input image such as a photograph, i.e., an original image indicated by (d) in FIG. 4, is converted into an edited image indicated by (e) in FIG. 4.

The tone curve can be expressed by a gradation conversion function, and an input image is edited by using the gradation conversion function. Accordingly, in the standard-type editing processes, when the input image is, for example, a photograph of a person with background, the color of the background and the person (i.e., object) or the color of the clothes are edited so as to approximate the color of the edited case image B.

FIG. 5 is a set of diagrams illustrating the transfer-type image editing performed by the image processing system 1, according to the present example embodiment. In the transfer-type image editing, as illustrated in FIG. 5, only a target reference image (i.e., the edited case image B) is used.

In the transfer-type image editing, the image processing system 1 performs editing processes such that the tone of an input image approximate that of a reference image. Accordingly, the tone of an input image such as a photograph, i.e., an original image indicated by (b) in FIG. 5, is edited so as to approximate that of the reference image indicated by (a) in FIG. 5, and is converted into an edited image as indicated by (c) in FIG. 5.

In the transfer-type image editing, the image processing system 1 edits an input image by using a known method such as color transfer. Accordingly, in the transfer-type editing processes, an input image such as a photograph of a person with background is edited such that the color of the background and the person (i.e., object) or the color of the clothes approximate the color of the edited case image B that serves as a reference image.

As the case images A and B generated as above are used as color-sample images, the image processing system 1 provides intuitive and easy-to-understand operability. Accordingly, editing can be achieved as desired with a fewer man-hours, and flexibility in the editing processes is also improved.

In the editing processes of an input image, one of the standard type and the transfer type is selected, for example, using the keyboard 25, such that one of the two sets of case information displayed on the display 24 according to the case identification information is selected.

In the following description, a method of generating a color-sample image used for editing an input image is described.

Figure 6:
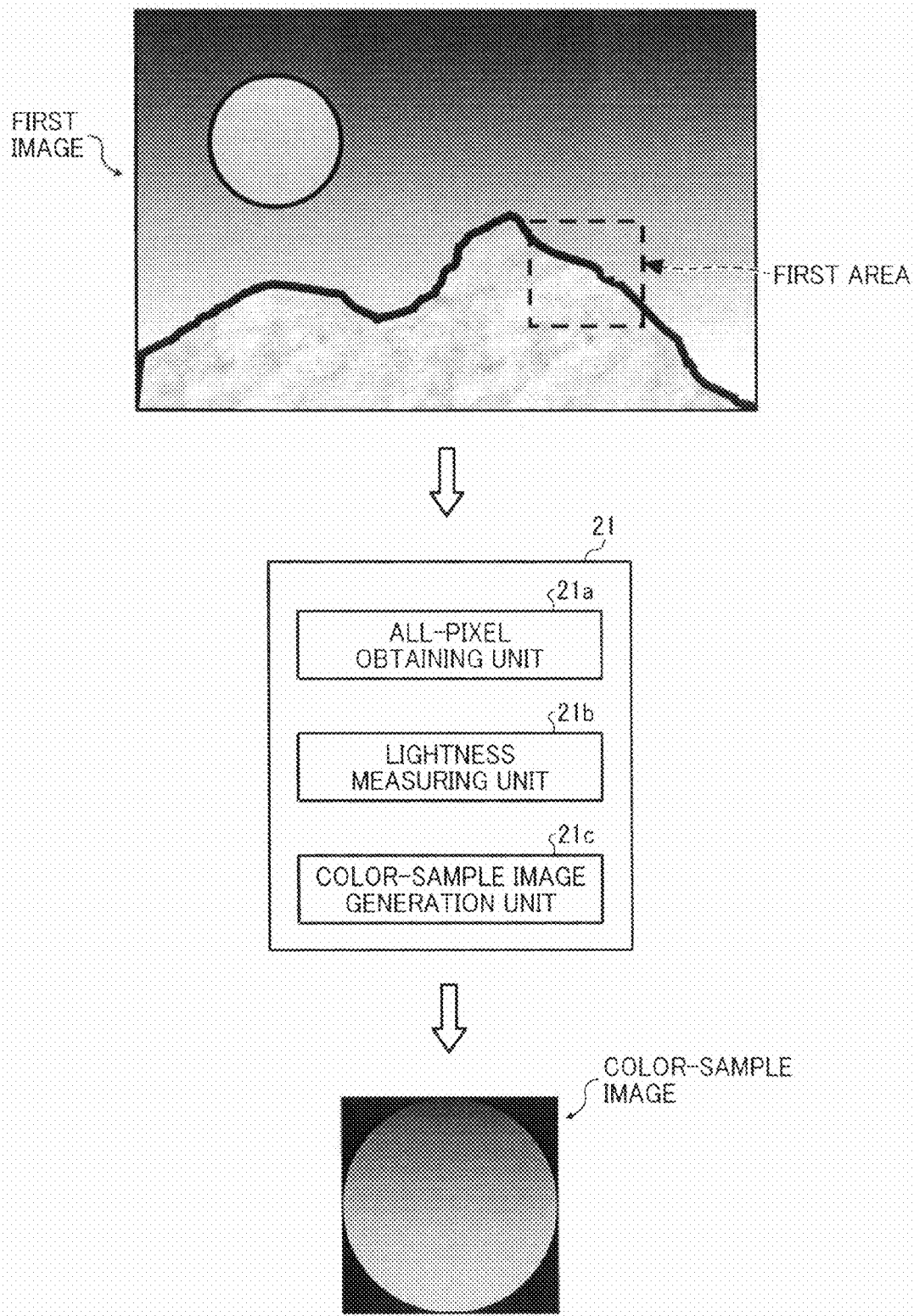
FIG. 6 is a functional block diagram of a color-sample generator that generates a color-sample image in an image processing system, according to an example embodiment of the present invention.

FIG. 6 is a functional block diagram of a color-sample generator that generates a color-sample image in the image processing system 1, according to the present example embodiment.

As illustrated in FIG. 6, the image processing device 2 according to the present example embodiment includes an all-pixel acquisition unit 21a, a lightness measuring unit 21b, and a color-sample image generator 21c that form a color-sample generator.

Each pixel of a first area, which is a certain area of a first image from which a color sample is to be extracted, has a color value (pixel value) of red, green, and blue (RGB) including, for example, lightness, color saturation, and hue angle.

The all-pixel acquisition unit 21a obtains all the pixels of a first area of a first image. The lightness measuring unit 21b measures the lightness (brightness) of each pixel of the duplication of all the pixels of the first area obtained by the all-pixel acquisition unit 21a. The color-sample image generator 21c rearranges the pixels whose lightness has been measured by the lightness measuring unit 21b, based on the level of lightness, in a second area of a second image that is different from the first area. Accordingly, a color-sample image in which all the pixels of the first area of the first image are rearranged in an abstract manner is generated.

[First Example Embodiment]

FIG. 7 and FIGS. 8A to 8F illustrate the procedure for generating a color-sample image according to a first example embodiment of the present invention.

In the following description, the functions of the all-pixel acquisition unit 21a, the lightness measuring unit 21b, and the color-sample image generator 21c are mainly implemented by the CPU 21, while using the temporary storage of the RAM 23, based on the program stored in the ROM 22.

Firstly, the all-pixel acquisition unit 21a obtains all the pixels of a first area (see FIG. 8B) of a first image such as a landscape image (see FIG. 8A). Then, the all-pixel acquisition unit 21a copies the obtained pixels to the RAM 23, as illustrated in FIG. 8C (step S1 of FIG. 7).

More specifically, the all-pixel acquisition unit 21a firstly obtains the first image that includes the first area from which a color sample is to be extracted (see FIG. 8A), from the server 3 on the network 4, which is accessible by the image processing device 2 through the IF 26. Then, the all-pixel acquisition unit 21a copies the obtained pixels of the first area (see FIG. 8B), for example, to memory space that is a row of or a column of an accessible storage unit, as a one-dimensional array allocated in the RAM 23.

The all-pixel acquisition unit 21a may obtain all the pixels of the first area only, from the server 3 on the network 4, which is accessible by the image processing device 2 through the IF 26.

Next, the lightness measuring unit 21b measures the lightness of each pixel of the duplicated pixels of all the pixels of the first area copied to the RAM 23, and rearranges the pixels one-dimensionally based on the level of lightness as illustrated in FIG. 8D (step S2 of FIG. 7).

As illustrated in FIG. 8D, pixels that have been rearranged based on the level of lightness have arrangement in which denser pixels are on the left and thinner pixels are on the right in terms of the density of RGB.

Next, the color-sample image generator 21c copies the pixels that are rearranged based on the level of lightness to a second area of a second image whose shape is different from that of the first area, in the rearranged order, as illustrated in FIG. 8E (step S3 of FIG. 7). In so doing, the color-sample image generator 21c rearranges the pixels based on the level of lightness in the second area that is, for example, a circle within the rectangular second image, from the top row to the bottom row.

Note that the number of pixels of the second area is, for example, equal to that of the first area. The area other than the second area in the second image (i.e., the background of the second image) may be filled with achromatic color that is not likely to affect the check of color reproduction, or the average color of the color of the area other than the first area in the first image (i.e., the background of the first image).

As illustrated in FIG. 8F, the color-sample image generator 21c generates the second image as a color-sample image by rearranging the pixels in the second area based on the level of lightness, and finally stores the generated color-sample image in the server 3 (step S4 of FIG. 7).

As described above, the image processing device 2 according to the present example embodiment generates a color-sample image by rearranging all the pixels of the first area of the first image from which a color sample is to be extracted, which are rearranged based on the level of lightness, in the second area of the second image that is different from the first area.

The generated color-sample image does not maintain the spatial structure of the first area, but maintains all the color data based on the color values of the pixels of the first area. Accordingly, the generated color-sample image maintains a normal appearance in an edited image, and the impression of the color of the first area can intuitively and accurately be reproduced.

[Second Example Embodiment]

Figure 9A:
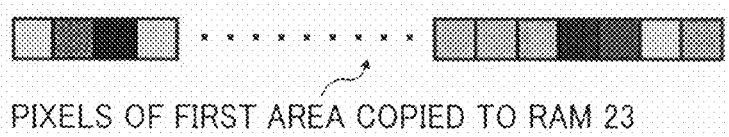
FIGS. 9A to 9C illustrate the procedure for generating a color-sample image according to the second example embodiment of the present invention.
Figure 9B:
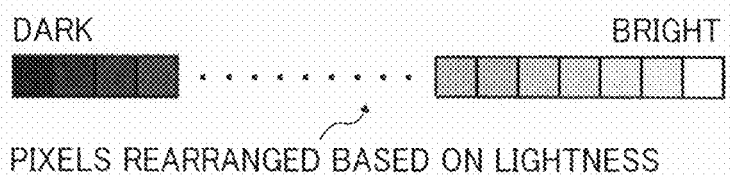
Figure 9C:
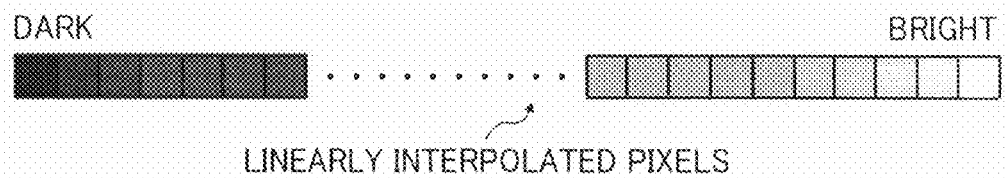

FIGS. 9A to 9C illustrates the procedure for generating a color-sample image according to a second example embodiment of the present invention.

In the first example embodiment, cases in which the number of pixels of the first area is equal to that of the second area have been described as above. In the second example embodiment, cases in which the number of pixels of the first area (N1) is different from that of the second area (N2) are considered.

In the following description, the functions of the all-pixel acquisition unit 21a, the lightness measuring unit 21b, and the color-sample image generator 21c are mainly implemented by the CPU 21, while using the temporary storage of the RAM 23, based on the program stored in the ROM 22.

When the number of pixels of the first area is greater than that of the second area (N1<N2), firstly, the all-pixel acquisition unit 21a copies the duplicated pixels of all the pixels of the first area to the memory space allocated in the RAM 23, as illustrated in FIG. 9A.

Next, the lightness measuring unit 21b measures the lightness of each pixel of all the pixels of the first area copied to the RAM 23, and rearranges the pixels based on the level of lightness in ascending order from left to right, as illustrated in FIG. 9B.

Next, the color-sample image generator 21c performs linear interpolation in the memory space allocated in the RAM 23, where the area for the number of pixels of the second area (N2) is allocated, such that the color value of the n-th pixel from the left in FIG. 9C becomes equivalent to the color value of the N-th pixel from the left in FIG. 9B. Note that the color-sample image generator 21c calculates the position of the N-th pixel that corresponds to the n-th pixel, for example, by "N1×(n/N2)".

More specifically, the color-sample image generator 21c of the image processing device 2 according to the present example embodiment performs known linear interpolation, and calculates the pixel value of each pixel as in the following formula (1) shown below.

For example, when N is an integer, the color-sample image generator 21c interpolates the pixel value V of the n-th pixel in FIG. 9C so as to become equivalent to the pixel value V of the N-th pixel value in FIG. 9B. On the other hand, when N is not an integer, the color-sample image generator 21c calculates the pixel value V of the n-th pixel in FIG. 9C from the pixel value Va of the a-th pixel and the pixel value Vb of the b-th pixel, where "a" is the largest integer that does not exceed N and "b" is the smallest integer that is not smaller than N. More specifically, the color-sample image generator 21c calculates the pixel value V of the n-th pixel by the following equation.

$$V=Va+(Vb-Va)\times(N-a) \quad (1)$$

If the color value defined in a uniform color space such as the Lab values of CIE (International Commission on Illumination/Commission International de L'Eclairage) in "L*a*b* color system" is used as the pixel value V, a more natural sensation or impression can be reproduced by the interpolation. Note that each of the pixels on which linear interpolation is performed has three factors in the color system including L*(L-star), a*(a-star), and b*(b-star). For this reason, the color-sample image generator 21c performs interpolation for all of the lightness variable L*, and chromaticity indices a* and b*, with the procedure described above.

Next, the color-sample image generator 21c copies the pixels on which interpolation has been performed according to the number of pixels of the second area to the second area whose number of pixels is different from that of the first area, based on the level of lightness.

Accordingly, the image processing device 2 according to the present example embodiment can generate a color-sample image of any number of pixels, and the number of pixels of the second area is not limited by the number of pixels of the first area.

The image processing device 2 according to the present example embodiment may also be used in a similar manner when the number of pixels of the second area is smaller than the number of pixels of the first area (N1>N2).

The image processing device 2 according to the present example embodiment may perform linear interpolation by an alternative unit other than the color-sample image generator 21c.

[Third Example Embodiment]

FIGS. 10A to 10C illustrate the procedure for generating a color-sample image according to a third example embodiment of the present invention. In the third example embodiment, cases are described in which a color-sample image is generated from a first area that has a plurality of pixels of equal level of lightness.

In the following description, the functions of the all-pixel acquisition unit 21a, the lightness measuring unit 21b, and the color-sample image generator 21c are mainly implemented by the CPU 21, while using the temporary storage of the RAM 23, based on the program stored in the ROM 22.

Firstly, as illustrated in FIG. 10A, the all-pixel acquisition unit 21a copies all the pixels of the first area to the memory space allocated in the RAM 23.

Next, the lightness measuring unit 21b measures the lightness of each pixel of the duplicated pixels of all the pixels of the first area copied to the RAM 23, and rearranges the pixels based on the level of lightness in ascending order from left to right, as illustrated in FIG. 10B.

The pixels that have the same level of lightness among the rearranged all pixels are rearranged again according to an attribute that is based on the color sense other than the lightness, as illustrated in FIG. 10C. For example, the pixels that have the same level of lightness are arranged in ascending order in terms of the color saturation ($\sqrt{(a^*\times a^*+b^*\times b^*)}$).

For example, the color-sample image generator 21c of the image processing device 2 according to the present example embodiment is further provided with a known color-saturation measuring function, and the color-sample image generator 21c calculates the saturation of, at least, the pixels that have the same level of lightness using the saturation measuring function.

When the number of pixels of the first area is different from that of the second area, the color-sample image generator 21c performs linear interpolation to interpolate the pixels to be copied to the second area, as described above. After performing the linear interpolation, the color-sample image generator 21c copies the pixels to the second area based on the level of lightness and color saturation in ascending order from left to right.

When the number of pixels of the first area is equal to that of the second area, the color-sample image generator 21c does not perform linear interpolation but just copies the pixels rearranged based on the level of lightness and color saturation to the second area in ascending order from left to right.

Accordingly, the image processing device 2 according to the present example embodiment can generate a color-sample image that is more closely approximated to the human color vision other than the lightness.

The image processing device 2 according to the present example embodiment may measure the saturation by an alternative unit other than the color-sample image generator 21c.

[Fourth Example Embodiment]

FIGS. 11A to 11F illustrate the procedure for generating a color-sample image according to a fourth example embodiment of the present invention.

In the third example embodiment described above, cases are described in which the pixels of equal level of lightness are rearranged again based on the level of color saturation in ascending order from left to right. In the fourth example embodiment, cases are described in which the pixels of equal level of lightness are rearranged again based on the level of color saturation in descending order from left to right.

In the following description, the functions of the all-pixel acquisition unit 21a, the lightness measuring unit 21b, and the color-sample image generator 21c are mainly implemented by the CPU 21, while using the temporary storage of the RAM 23, based on the program stored in the ROM 22.

Firstly, as illustrated in FIG. 11A, the all-pixel acquisition unit 21a copies all the pixels of the first area to the memory space allocated in the RAM 23.

Next, the lightness measuring unit 21b measures the lightness of each pixel of the duplicated pixels of all the pixels of the first area copied to the RAM 23, and rearranges the pixels based on the level of lightness in descending order from left to right, as illustrated in FIG. 11B.

Then, the image processing device 2 according to the present example embodiment rearranges the pixels that have the same level of lightness among the rearranged all pixels according to an attribute that is based on the color sense other than the lightness, as illustrated in FIG. 11C. For example, the pixels that have the same level of lightness are arranged descending order in terms of the color saturation.

When the number of pixels of the first area is different from that of the second area, as illustrated in FIG. 11D, the color-sample image generator 21c performs the linear interpolation as described above to interpolate the pixels to be copied to the second area. After performing the linear interpolation, the color-sample image generator 21c copies the pixels to the second area based on the level of lightness and color saturation in descending order from left to right (see FIG. 11E).

When the number of pixels of the first area is equal to that of the second area, the color-sample image generator 21c does not perform linear interpolation but just copies the pixels rearranged based on the level of lightness and color saturation to the second area in descending order from left to right.

In ordinary real space, it is usually the case that a light source such as the sun or electric light is above an object such as a person, and thus the upper portion is brighter in many images. The image processing device 2 according to the present example embodiment can generate a color-sample image in which the upper portion of the second area is brighter than the lower portion, as illustrated in FIG. 11F. In other words, the image processing device 2 according to the present example embodiment can generate a color-sample image whose visual impression is natural and close to the impression of the first area of an actual photograph (i.e., un-edited input image).

[Fifth Example Embodiment]

Figure 12A:
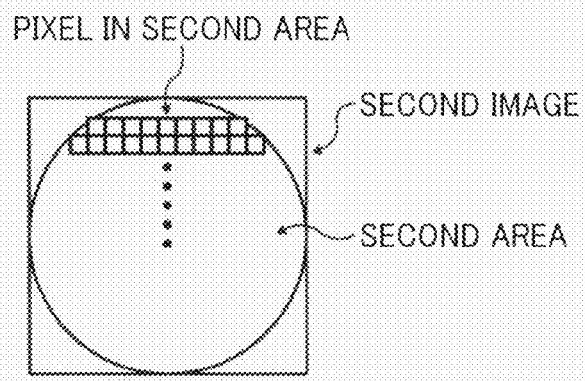
FIGS. 12A to 12C illustrate the procedure for generating a color-sample image according to a fifth example embodiment of the present invention.
Figure 12B:
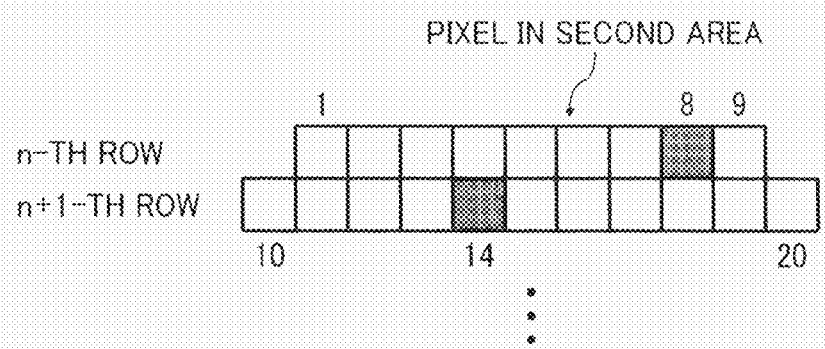
Figure 12C:
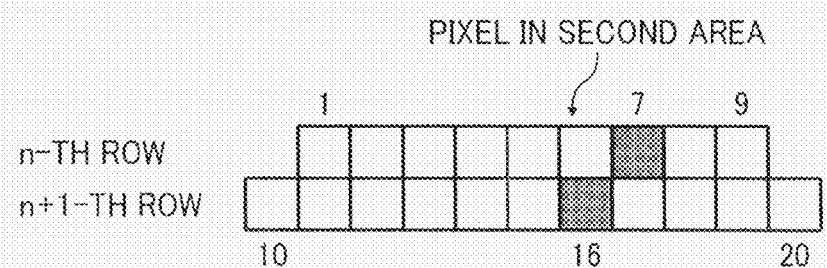

FIGS. 12A-12C illustrates the procedure for generating a color-sample image according to a fifth example embodiment of the present invention. In the fifth example embodiment, cases in which the pixels are rearranged in further view of the hue angle are described.

For example, the image processing device 2 according to the present example embodiment rearranges the duplicated pixels of all the pixels of the first area based on the level of lightness, and rearranges the pixels that have the same level of lightness based on the level of color saturation. Further, the image processing device 2 performs linear interpolation as necessary, and copies the pixels to the second area from the upper row of the second area to the lower row of the second area, as illustrated in FIG. 12A.

For example, as illustrated in FIG. 12B, the image processing device 2 rearranges the twenty pixels from the first pixel of the n-th row to the n+1-th row of the second area, based on the level of lightness, the level of color saturation, and whether or not interpolation has been performed thereon.

For this reason, even if the levels of lightness and color saturation are close to each other among neighboring pixels, the hue angle may be significantly different from each other among such neighboring pixels, and such neighboring pixels whose hue angle is different from each other may be arranged with distance (for example, the eighth pixel and the fourteenth pixel in FIG. 12B).

When the hue angle of a certain pixel is significantly different from that of neighboring pixels, such a pixel appears in a totally different color from the neighboring pixels (for example, the difference in hue angle is almost one-hundred eighty degrees when the colors of two given pixels are red and green). Accordingly, when the pixels are rearranged without considering the hue angle, dots whose color is different from that of neighboring pixels are distributed and the appearance of the pixels become very unnatural due to its fine structure.

In view of the above circumstances, after the pixels are once copied to the second area (see FIG. 12B), the image processing device 2 according to the present example embodiment rearranges the pixels again based on the hue angle on a row-by-row basis. By so doing, as illustrated in FIG. 12C for example, the pixels whose hue angles are close to each other, which are arranged in different rows in a color-sample image, are rearranged so as to be close to each other (i.e., the seventh and sixteenth pixel in FIG. 12C). Accordingly, the unnatural appearance in color as mentioned above can be attenuated in a generated color-sample image.

The color-sample image generator 21c rearranges a group of pixels that have been arranged based on the level of lightness and color saturation, for example, from the upper row to the lower row, based on the hue angle on a row-by-row basis. Accordingly, the unnatural appearance in color as mentioned above can be attenuated in the second area.

As an alternative method of attenuating the unnatural appearance in color as mentioned above, a group of pixels that are copied to the second area may be filtered using, for example, a low-pass filter that blurs an image, in order to reduce the undesired influence of its fine structure reflected on a newly generated color-sample image.

The image processing device 2 according to the present example embodiment may rearranges the pixels based on the hue angle by an alternative unit other than the color-sample image generator 21c.

[Sixth Example Embodiment]

Figure 13:
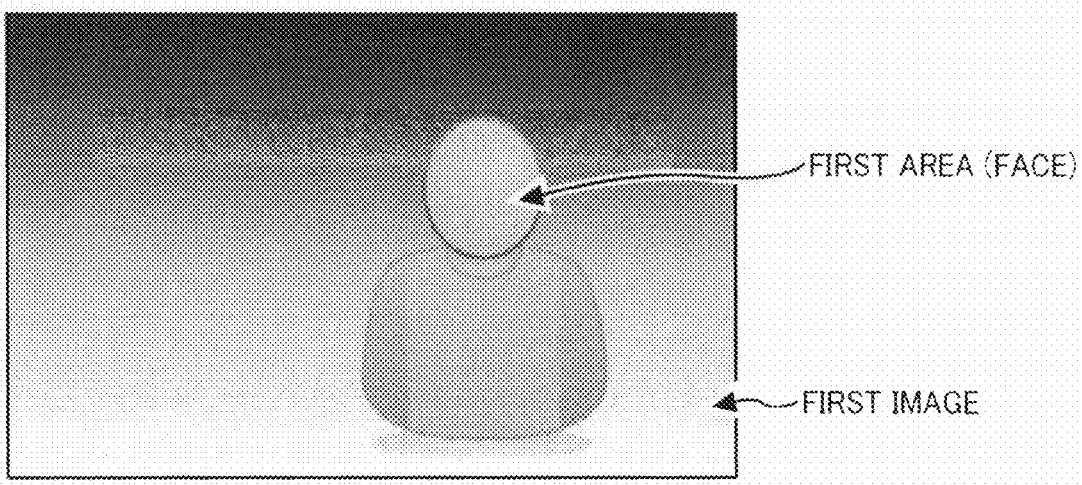
FIG. 13 is a diagraph related to the generation of a color-sample image according to a sixth example embodiment of the present invention.

FIG. 13 is a diagram related to the generation of a color-sample image according to a sixth example embodiment of the present invention. In the sixth example embodiment, cases in which the first area as a certain area is set on an object-by-object basis are described. The object is, for example, the face of a person in a first image from which a color sample is to be extracted.

The image processing device 2 according to the present example embodiment selects an object such as the image of a person in the first image as all the pixels of the first area. By so doing, the image processing device 2 can generate a color-sample image in which a normal appearance is maintained and the impression of the color of a specific object such as a face is accurately reproduced.

As described above, according to the present example embodiment, the impression of color in actual environments can be accurately reproduced on a color-sample image by rearranging all the pixels of the specific area of the original image in an abstract manner.

In other words, the image processing device 2 that serves as a color-sample generator rearranges all the pixels of the first area of the first image from which a color sample is to be extracted, based on the level of lightness, and then arranges the rearranged pixels in the second area of the second image that is different from the first area. By so doing, when the un-edited image is an input image such as a photograph, the image processing device 2 can generate a color-sample image in which the pixels of the actual photograph are reproduced in an abstract manner, and the visual impression of the color-sample image become close to the visual impression of the real object. Accordingly, in the image processing system 1 that edits an input image such as a photograph using a color-sample image, the impression of color can intuitively be compared, and the impression of color in actual environments can be accurately reproduced.

By using such a color-sample image, the image processing system 1 can provide intuitive and easy-to-understand operability. Accordingly, editing can be achieved as desired with a fewer man-hours, and the flexibility in the editing processes is also improved.

In the example embodiments described above, cases in which an input image as a un-edited image is a photograph have been described above. However, no limitation is intended thereby, and the un-edited image may be obtained from a printed material or an object with bumps and dips on the surface.

As a matter of course, a color-sample image is not limited to a circular second area that is included within a rectangular second image.

As described above, according to the example embodiments of the present invention, the impression of color in actual environments can be accurately reproduced on a color-sample image, and such an advantageous effect may be generally applied to color samples, color-sample generators, methods of generating the color sample, and image processing systems in which the color samples are used.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A color-sample image generator for producing a color sample, comprising:
   processing circuitry configured to
   measure lightness of every pixel of a first area of a first image,
   arrange all the pixels in a second area of a second image that is different from the first area, based on lightness level, and
   linearly interpolate a group of pixels duplicated from all the pixels, according to a number of pixels of the second area, and arrange the linearly interpolated pixels in the second area.

2. The color-sample image generator according to claim 1, wherein the processing circuitry is further configured to rearrange pixels of equal level of lightness among the group of pixels duplicated from all the pixels, based on a level of color saturation in descending order.

3. The color-sample image generator according to claim 1, wherein the processing circuitry is further configured to arrange the group of pixels duplicated from all the pixels, from an upper row to a lower row of the second area.

4. The color-sample image generator according to claim 3, wherein the processing circuitry is further configured to rearrange the group of pixels based on hue angle on a row-by-row basis.

5. The color-sample image generator according to claim 4, wherein the processing circuitry is further configured to rearrange the group of pixels based on the hue angle on a row-by-row basis, which attenuates unnatural appearance in color in the second area.

6. The color-sample image generator according to claim 1, wherein all the pixels of the first area correspond to an object in the first image.

7. A color sample generated by the color-sample image generator according to claim 1.

8. A color-sample generator, comprising:
   processing circuitry configured to
   obtain all pixels of a first area of a first image,
   measure a level of lightness of each obtained pixel of the first area, and
   rearrange each of the pixels whose lightness has been measured, based on the level of lightness, in a second area of a second image that is different from the first area, to generate the color sample,
   wherein the processing circuitry is further configured to linearly interpolate a group of pixels duplicated from all the pixels, according to a number of pixels of the second area, and arrange the linearly interpolated pixels in the second area.

9. A color-sample generation method, comprising:
   obtaining, by processing circuitry, all pixels of a first area of a first image;
   measuring, by the processing circuitry, a level of lightness of each of the obtained pixels of the first area;
   rearranging, by the processing circuitry, each of the pixels whose lightness has been measured based on the level of lightness, in a second area of a second image that is different from the first area;
   linearly interpolating, by the processing circuitry, a group of pixels duplicated from all the pixels, according to a number of pixels of the second area, and arrange the linearly interpolated pixels in the second area; and
   storing in a memory the second image having the pixels that are rearranged based on the level of lightness as a color sample.

* * * * *